Figure 1:
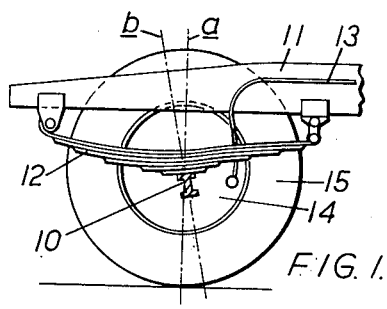

Aug. 10, 1965    G. F. BOYS    3,199,892
VEHICLE SPRING SUSPENSIONS
Filed March 13, 1963    2 Sheets-Sheet 1

INVENTOR:
Godfrey Frank Boys
BY
Scrivener and Parker

Aug. 10, 1965  G. F. BOYS  3,199,892
VEHICLE SPRING SUSPENSIONS

Filed March 13, 1963  2 Sheets-Sheet 2

INVENTOR:
Godfrey Frank Boys
BY
Scrivener and Parker

United States Patent Office 3,199,892
Patented Aug. 10, 1965

3,199,892
VEHICLE SPRING SUSPENSIONS
Godfrey F. Boys, Walsall, England, assignor of one-half to Henry Boys & Son Limited, Walsall, England
Filed Mar. 13, 1963, Ser. No. 264,940
Claims priority, application Great Britain, Mar. 21, 1962, 10,782/62
6 Claims. (Cl. 280—104.5)

This invention relates to vehicle spring suspensions of the kind in which the chassis or body of the vehicle is mounted on the wheel axles by semi-elliptic or other leaf springs which are provided to afford cushioned riding and to reduce the transmission of road shocks from the axles to the said chassis or body under normal or free running conditions. Whereas, under such conditions, conventional vehicle spring suspensions of the kind referred to operate satisfactorily they exhibit undesirable characteristics when the wheel brakes are applied. Thus with a conventional suspension in which each end of a dead axle, or axle casing, is connected to the vehicle chassis or body by a multiple leaf semi-elliptic spring, the application of the wheel brakes imposes considerable torsional force upon said dead axle, or axle casing (to which the stationary parts of the brakes are fixed), and causes it to turn about its axis until this is resisted by the springs and opposing forces are developed in the latter to overcome the brake torque; these actionary and reactionary forces not only subject the springs to severe stresses but produce the undesirable characteristic known as "axle jump" or "axle shudder" which is exhibited as a periodic vibration transmitted through the over-stressed springs to the chassis or body of the vehicle. Where the spring suspension is of the "twin bogie" type with the two axles, in tandem, and the two semi-elliptic springs at each side closely coupled by a rocker beam balance mechanism, the above described actionary and reactionary forces set up by the application of the brakes cause the rearmost axle to have a tendency to lift the foremost axle and set up an undesirable condition generally referred to as "axle hop."

In a spring suspension of the "walking beam" type, in which the front and rear axles, in tandem, are carried by the front and rear ends respectively of two laterally spaced and inverted half-elliptic springs which are centrally pivoted to the vehicle chassis or body, the actionary and reactionary forces resulting from application of the brakes cause the foremost axle to tend to lift the rearmost axle and set up "axle hop."

The present invention has for its object to provide in vehicle spring suspensions of the kind referred to, means for preventing the development of above described undesirable characteristics when the brakes are applied.

According to the invention in a vehicle having a chassis, an axle, leaf spring means interconnecting the chassis and the axle, wheels supported on said axle and means for applying brakes associated with said wheels, there is provided the improvement which comprises a linkage interconnecting the axle and chassis, said linkage including an arm rigidly secured to the axle and extending transversely thereof, and including also a link connected at one end to the arm and extending generally at right angles to the arm to the other end of the link which is connected with the chassis, said link being normally variable in its effective length to accommodate relative movement between the axle and chassis, and means controlled by operation of said brake applying means for preventing variation in the length of said link so that the latter operates as a rigid member to prevent rotation of said axle during the brake applying operation.

According to a preferred feature of the invention, the linkage above referred to comprises a fluid-pressure cylinder and piston assembly having a normally open by-pass which interconnects the working spaces at opposite sides of the piston head and which is automatically closed by a valve when the brakes are applied. Where the vehicle has fluid-pressure brakes, the by-pass control valve would be closed by the brake application pressure in the brake system, whilst where the vehicle has mechanically applied brakes, the by-pass control valve would be directly operated by the brake operating mechanism; in either event the said assembly would be arranged with the common axis of the cylinder and piston disposed tangentially to the axis of the axle or axle casing, one element of said assembly being pivotally connected to an appropriate point on the vehicle chassis or body and the other element thereof being pivotally connected to a radial arm, or the equivalent, formed integrally with or fixed to the axle, or axle casing.

The invention will now be described with reference to and by the aid of the accompanying drawings illustrating, somewhat diagrammatically and in side elevation, three conventional spring suspensions and, by means of respectively comparative views, the application of the invention thereto. In each of the views the suspension is shown under brake-applied condition and the direction of vehicle travel is to the left.

Figure 2:
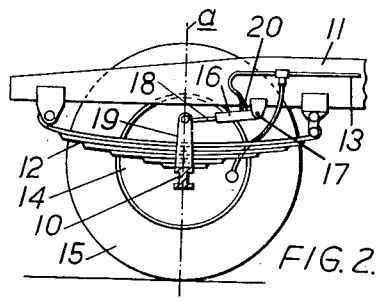

FIG. 1 of the drawings shows a conventional suspension in which the wheel axle is connected by semi-elliptic springs to the chassis, and FIG. 2 shows the application of the invention to this suspension.

Figure 3:
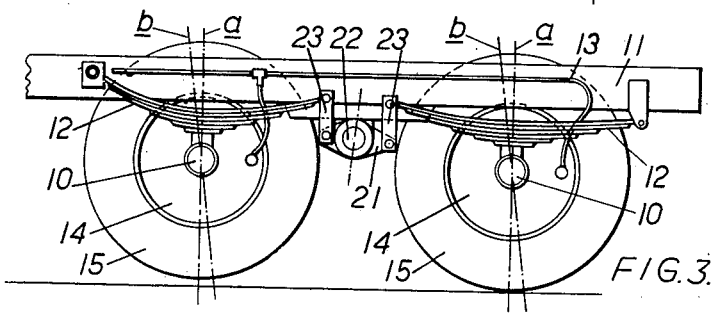
Figure 4:
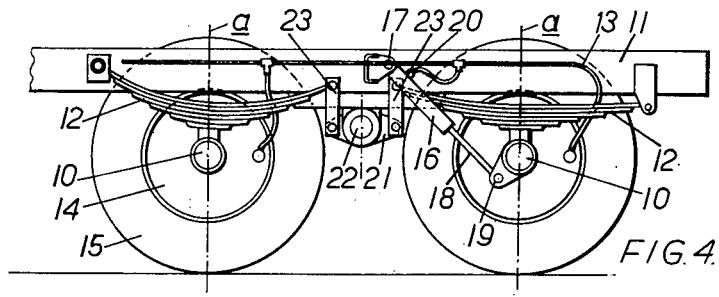

FIG. 3 of the drawings shows a conventional "twin bogie" spring suspension, and FIG. 4 shows the application of the invention thereto.

Figure 5:
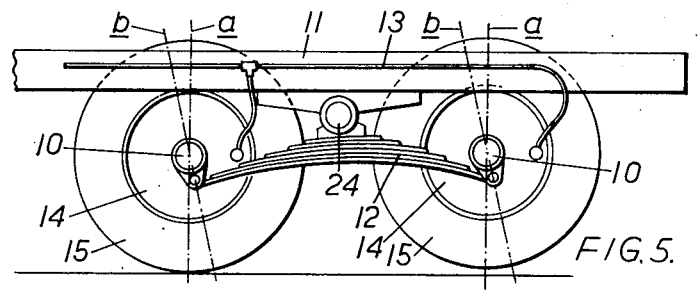
Figure 6:
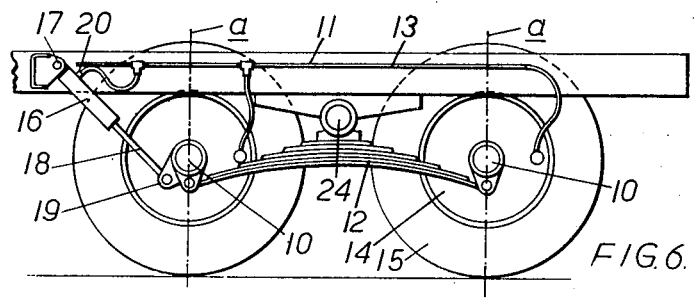

FIG. 5 of the drawings shows a conventional "walking beam" spring suspension, and FIG. 6 shows the application of the invention thereto.

Figure 7:
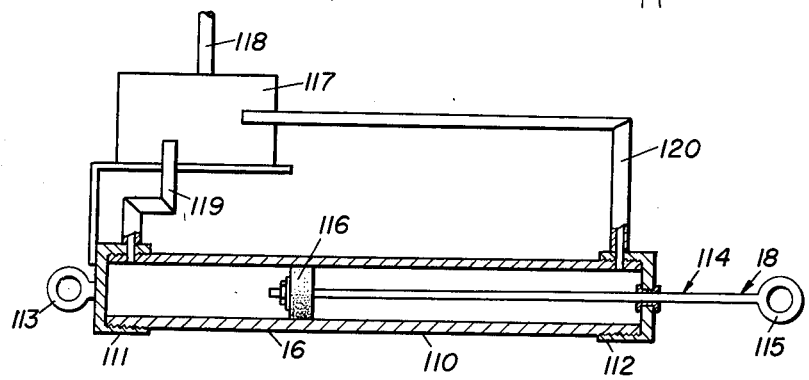

FIG. 7 of the drawings shows the variable link used in the invention with its control valve, partly in section.

Referring particularly to FIG. 1 of the drawings in which each end of a dead axle 10 is connected to the vehicle chassis 11 by a multiple leaf spring 12, it will be seen that under the brake-applied condition the torsional force imposed upon the axle 10 causes it to turn about its axis, from a normal disposition represented by the chain line $a$ to that shown and represented by the chain line $b$, against the resistance of the springs 12 until opposing forces developed in the latter overcome the brake torque. Not only do these actionary and reactionary forces subject the springs 12 to severe stresses but they also produce "axle jump" or "axle shudder" which results in increased tyre wear. The brakes are applied by fluid pressure supplied through a pressure line 13, in conventional manner, to a shoe-actuating cylinder in a brake drum 14 in relation to which the wheel 15 is rotatable.

Referring now to FIG. 2, which like references to those used in FIG. 1 indicate like or analogous parts, the spring suspension is provided, between the axle 10 and the chassis 11, with a linkage comprising a fluid pressure cylinder 16 pivotally connected at 17 to the chassis 11 and a piston 18 pivotally connected to a radial arm 19 fixed to the axle 10, the arrangement being such that the common axis of the cylinder 16 and piston 18 is normally disposed tangentially to a circle co-axial with the wheel mounted on the axle 10. The cylinder and piston assembly 16, 18 is of known type in which the cylinder 16 has a valve controlled by-pass interconnecting the working spaces at opposite sides of the piston head, and the control valve 20 is connected to the pressure line 13 of the brake system. This arrangement is such that under normal free running conditions the by-pass is open so that fluid in the cylinder 16 can be displaced from end to end thereof by the piston 18 and the relative movements of the vehicle chassis 11 and the axle 10 can be accommodated, the effective length of the cylinder and piston assembly 16, 18 varying, as required, whilst when the brakes are applied, and in consequence the said control valve 20 is operated by the line pressure to close the by-pass, transfer of fluid cannot take place and the cylinder 16 and piston 18 become locked against relative movement and jointly serve, either in compression as a strut or in tension as a stay, to prevent rotation of the axle 10 under brake torque action.

FIG. 7 shows diagrammatically the piston cylinder assembly 16, 18. The cylinder 16 comprises a barrel 110 which is threaded at its ends and received in end caps 111 and 112. The end cap 111 is provided with an eye bolt 113 for pivotally mounting the cylinder 16 on the chassis. The other end cap 112 is provided with an aperture through which passes the piston rod 114 of the piston 18. The free end of the piston rod 114 is provided with an eye 115 for connection to the arm 19. At its inner end, the piston rod 114 is provided with a piston 116 which is in slidable sealing relation with the interior of the barrel 110.

A control valve is indicated generally at 117 and this is operated by fluid-pressure which is supplied through a conduit 118 from the brake line 13. The left-hand end of the cylinder is connected to the control valve 117 through a conduit 119 which is connected to the end cap 111. The right-hand end of the cylinder is connected to the control valve 117 through a conduit 120.

The operation of the piston cylinder assembly 16, 18 is as follows. When fluid-pressure is applied to the conduit 118 it moves a valve member within the valve to cut off communication between the conduits 119 and 120 so that the piston 16 can no longer move relative to the cylinder. When the fluid-pressure is relieved from the conduit 118 the valve member is spring loaded to a position in which communication exists between the conduits 119 and 120 so that the piston 116 is free to move longitudinally of the cylinder 16. It will be appreciated from the foregoing description that when the brakes are operated the brake pressure is applied to the conduit 118 thus closing the control valve 117 and causing the link to act as a rigid strut or stay. The construction of FIG. 7 is conventional, see British Patent No. 741,832 to Adrolic Engineering Company Limited, published December 14, 1955.

The references used in FIG. 2 are employed to indicate respectively the same or analogous parts in FIGS. 3, 4, 5 and 6.

Referring now to the conventional "twin bogie" suspension system shown in FIG. 3 in which the multiple semi-elliptic leaf springs 12 at each side are closely coupled between their adjacent ends by a rocker beam 21, pivotally mounted at 22 on the chassis 11 and pivotal end links 23, it will be seen that under brake-applied conditions the torque reaction, represented by the acute angle between the chain lines $a$ and $b$, causes rearmost of the two axles 10 to have a tendency, through the close coupling means between the springs 12, to lift the foremost or leading axle 10, as shown, and thereby set up "axle hop." In the modification of this arrangement, by application of the invention as shown in FIG. 4, severe stressing of the springs 12 and "axle hop" due to braking torque are prevented as a result of the cylinder and piston assembly 16, 18 serving as a rigid strut or stay between the chassis 11 and the radial arm 19 on the rearmost or trailing axle 10 when the brakes are applied. If necessary or desirable the foremost or leading axle may also be connected to the chassis by a linkage including a radial arm, cylinder and piston similar in manner to that associated with the rearmost or trailing axle.

Referring now to the conventional "walking beam" type of spring suspension shown in FIG. 5, in which the tandem axles 10 at each side are interconnected by a multiple-leaf inverted semi-elliptic spring 12 which is pivoted centrally at 24 on the chassis 11, it will be seen that the brake torque reaction, represented by the acute angle between the lines $a$ and $b$, results in lifting of the rearmost of the two axles and setting up of "axle hop." Reference to FIG. 6 of the drawings shows that application of the present invention to this "walking beam" suspension, by providing a radial arm 19 on the foremost axle 10, connecting said arm to the chassis by a cylinder and piston assembly 16, 18 and connecting the cylinder by-pass valve 20 to the pressure line of the braking system, prevents over stressing of the springs 12 and of "axle hop." A similar cylinder and piston assembly and radial arm may also be provided between the rearmost axle and an appropriate point on the chassis so that the brake torque reaction will be taken by both linkages.

The various applications of the invention not only prevent the development of the undesirable characteristics mentioned but also improve brake efficiency.

Having fully described my invention, what I claim and desire to secure by Letters Patent is:

1. In a vehicle having a chassis, an axle, leaf spring means interconnecting the chassis and axle, wheels supported on said axle and means for applying brakes associated with said wheels, the improvement which comprises a linkage interconnecting the axle and chassis, said linkage including an arm rigidly secured to the axle and extending transversely thereof, and including also a telescopic link connected at one end to the arm and extending generally at right angles to the arm, the other end of the link being connected with the chassis, said link being normally variable in its effective length to accommodate relative movement between the axle and chassis, and means controlled by operation of said brake applying means for preventing variation in the length of said link so that the latter operates as a rigid member for opposing any torsional force on said axle to prevent rotation of the latter during the brake applying operation.

2. The improvement as claimed in claim 1, comprising a second axle coupled in tandem with the first axle and wherein the leaf spring means interconnects both axles with the chassis.

3. In a vehicle having a chassis, an axle, leaf spring means interconnecting the chassis and axle, wheels supported on said axle and means for applying brakes associated with said wheels, the improvement which comprises a linkage interconnecting the axle and chassis, said linkage including a generally vertical arm rigidly secured to the axle and including also a generally horizontal telescopic link connected with the arm at one end and connected with the chassis at the other, said link being normally variable in its effective length to accommodate relative movement between the axle and chassis, and control means controlled by operation of said brake applying means preventing variation in the length of said link so that the latter operates as a rigid member for opposing any torsional force on said axle to prevent rotation of the latter during the brake applying operation.

4. The improvement as claimed in claim 3 wherein the link comprises a fluid-pressure cylinder and piston assembly and wherein the control means comprises a normally open by-pass interconnecting the working spaces at opposite sides of the piston, a valve in said by-pass and means operatively connecting the valve to the brake applying means so as to close the by-pass during the brake applying operation.

5. In a vehicle having a chassis, an axle, leaf spring means interconnecting the chassis and axle, wheels supported on said axle and means for applying brakes associated with said wheels, the improvement which comprises a linkage interconnecting the axle and chassis, said linkage including an arm rigidly secured to the axle and extending therefrom in a direction inclined downwardly and in the forward direction of movement of the vehicle, and including also a telescopic link connected at one end to the arm and inclined upwardly and in said forward direction to the other end of the link which is connected with the chassis, said link being normally variable in its effective length to accommodate relative movement between the axle and chassis, and control means controlled by operation of said brake applying means for preventing variation in the length of said link so that the latter operates as a rigid member for opposing any torsional force on said axle to prevent rotation of the latter during the brake applying operation.

6. The improvement as claimed in claim 5 wherein the link comprises a fluid-pressure cylinder and piston assembly and wherein the control means comprises a normally open by-pass interconnecting the working spaces at opposite side of the piston, a valve in said by-pass and means operatively connecting the valve to the brake applying means so as to close the by-pass during the brake applying operation.

References Cited by the Examiner
UNITED STATES PATENTS

| | | | |
|---|---|---|---|
| 1,179,209 | 4/16 | More | 267—67 |
| 1,948,185 | 2/34 | Padgett. | |
| 1,997,923 | 4/35 | Bowen | 280—124 |
| 2,061,985 | 11/36 | Saurer. | |
| 2,247,749 | 7/41 | De Venel. | |
| 2,699,935 | 1/55 | Meier | 267—66 |
| 2,763,332 | 9/56 | Tatum | 180—85 |
| 2,856,200 | 10/58 | Conflitti | 280—124 |

ARTHUR L. LA POINT, *Primary Examiner.*